US012679344B2

(12) United States Patent
Ragusa et al.

(10) Patent No.: US 12,679,344 B2
(45) Date of Patent: Jul. 14, 2026

(54) LEADING VEHICLE BRAKING DETECTION

(71) Applicant: INTERNATIONAL BUSINESS MACHINES CORPORATION, Armonk, NY (US)

(72) Inventors: Roberto Ragusa, Rome (IT); Remo Freddi, Ronciglione (IT); Chiara Conti, Rome (IT); Alessandra Asaro, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 359 days.

(21) Appl. No.: 17/933,526

(22) Filed: Sep. 20, 2022

(65) Prior Publication Data

US 2024/0092351 A1      Mar. 21, 2024

(51) Int. Cl.
| | |
|---|---|
| *B60W 30/09* | (2012.01) |
| *B60W 30/095* | (2012.01) |
| *G06V 20/58* | (2022.01) |

(52) U.S. Cl.
CPC ........ *B60W 30/09* (2013.01); *B60W 30/0956* (2013.01); *G06V 20/584* (2022.01); *B60W 2420/403* (2013.01); *B60W 2554/80* (2020.02)

(58) Field of Classification Search
CPC .. B60W 30/08; B60W 30/09; B60W 30/0956; B60W 40/11; B60W 50/0097; B60W 60/001; B60W 60/0015; B60W 60/00272; B60W 2420/403; B60W 2554/40; B60W 2554/4042;

(Continued)

(56) References Cited

U.S. PATENT DOCUMENTS

| | | | |
|---|---|---|---|
| 6,002,329 A | 12/1999 | Marks | |
| 9,864,916 B2 * | 1/2018 | Botusescu | ............ G06V 20/584 |

(Continued)

FOREIGN PATENT DOCUMENTS

| | | |
|---|---|---|
| DE | 102011118135 B4 | 4/2017 |
| EP | 2578464 B1 | 3/2014 |

(Continued)

OTHER PUBLICATIONS

Isermann, et al., "Anticollision system PRORETA with automatic braking and steering", Vehicle System Dynamics: International Journal of Vehicle Mechanics and Mobility, 46:S1, Published online Jan. 28, 2009, pp. 683-694. Taylor & Francis, Dec. 18, 2014, 13 Pages. http://dx.doi.org/10.1080/00423110802036968.

(Continued)

*Primary Examiner* — Brandon Z Willis
(74) *Attorney, Agent, or Firm* — Rakesh Roy

(57) ABSTRACT

A method, computer system, and a computer program product for brake detection is provided. The present invention may include determining a first geometric ratio associated with a rear portion of a first vehicle, from a first image of the first vehicle. The present invention may also include determining a second geometric ratio associated with the rear portion of the first vehicle, from a second image of the first vehicle. The present invention may further include, in response to determining that the second geometric ratio is less than the first geometric ratio, detecting a braking action of the first vehicle.

17 Claims, 5 Drawing Sheets

(58) Field of Classification Search

CPC . B60W 2554/4046; B60W 2554/4045; B60W 2554/80; B60W 2554/804; B60W 2754/10; B60W 2754/50; B60W 2530/201; G08G 1/16; G08G 1/166; G06V 20/56; G06V 20/58; G06V 20/584; G06V 20/588

See application file for complete search history.

(56) References Cited

U.S. PATENT DOCUMENTS

| | | | | |
|---|---|---|---|---|
| 10,262,212 | B1 * | 4/2019 | Eiden | G06V 20/56 |
| 10,579,885 | B2 | 3/2020 | Stein | |
| 11,597,361 | B2 * | 3/2023 | Osterhoff | B60T 7/12 |
| 2008/0180528 | A1 * | 7/2008 | Saito | H04N 7/18 |
| | | | | 348/148 |
| 2021/0370829 | A1 * | 12/2021 | Lee | G06V 20/584 |

FOREIGN PATENT DOCUMENTS

| | | |
|---|---|---|
| JP | 2007015525 A | 1/2007 |
| KR | 20160041136 A | 4/2016 |
| WO | 2001/039018 A1 | 5/2001 |

OTHER PUBLICATIONS

Justia, "Braking system having variable intensity light and sound warning", Justia.com, Jul. 26, 1994, 11 Pages. https://patents.justia.com/patent/5481243.

Unknown, "Sudden Stop Early Detection Brake Light System with Varying Intensity", IP.com, IPCOM000004430D, Nov. 10, 2000, 3 Pages.

* cited by examiner

Figure 1:
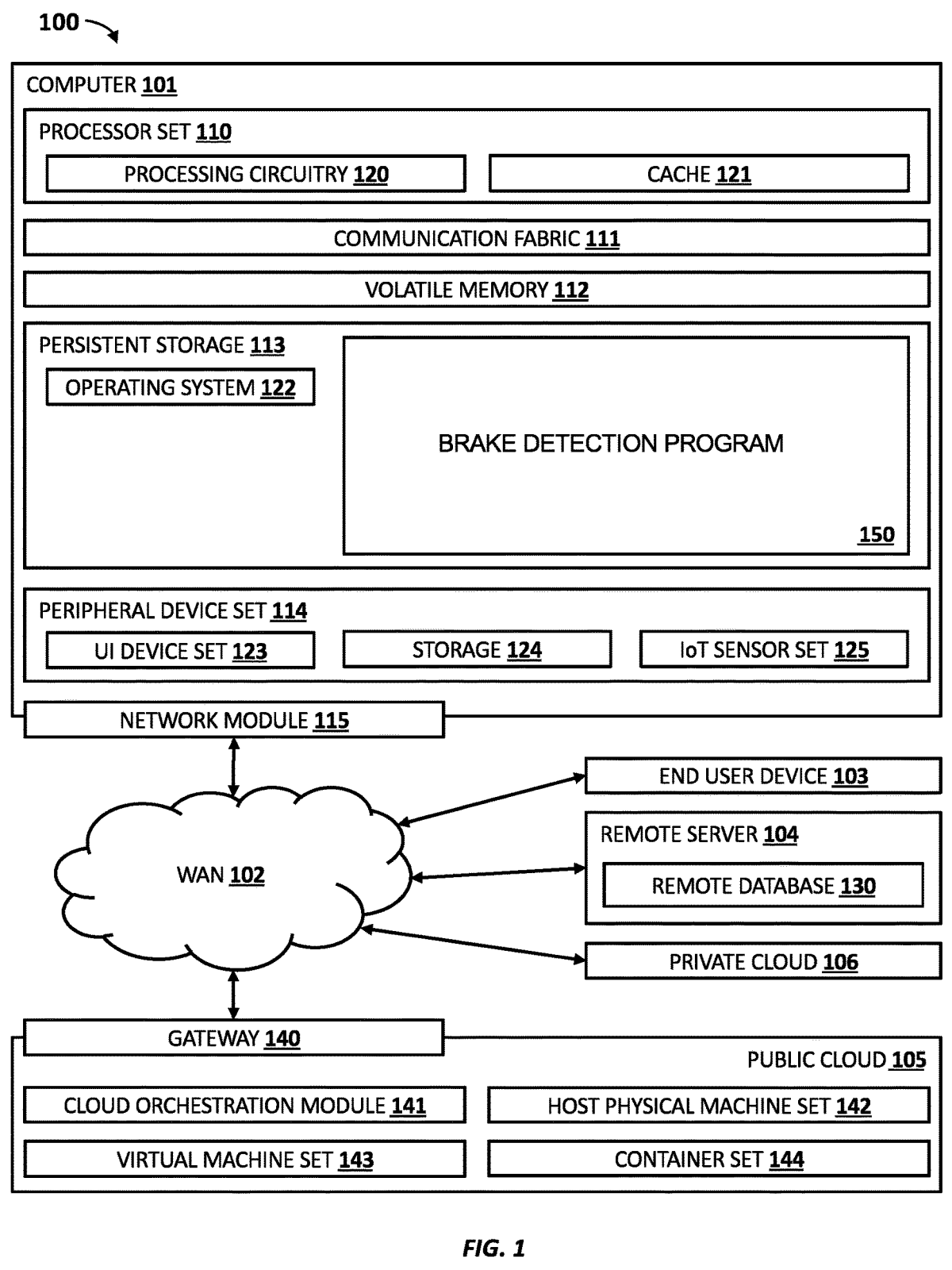

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

BRAKE DETECTION PROGRAM

150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

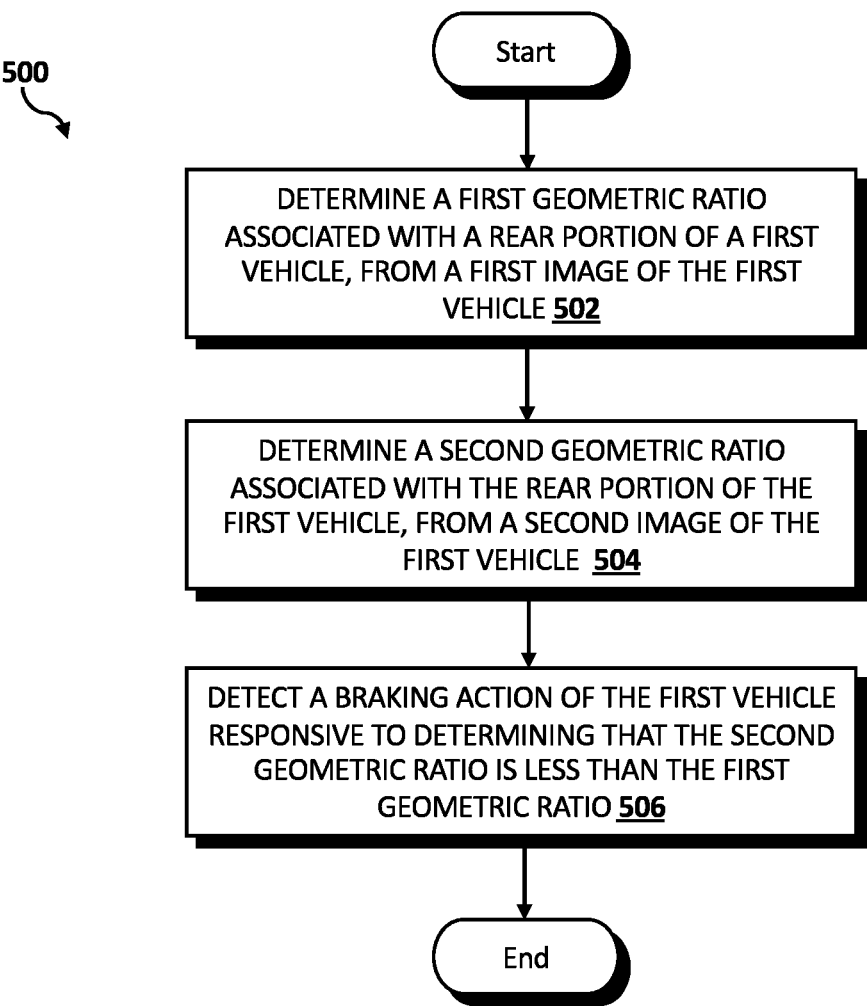

Start

DETERMINE A FIRST GEOMETRIC RATIO ASSOCIATED WITH A REAR PORTION OF A FIRST VEHICLE, FROM A FIRST IMAGE OF THE FIRST VEHICLE 502

DETERMINE A SECOND GEOMETRIC RATIO ASSOCIATED WITH THE REAR PORTION OF THE FIRST VEHICLE, FROM A SECOND IMAGE OF THE FIRST VEHICLE 504

DETECT A BRAKING ACTION OF THE FIRST VEHICLE RESPONSIVE TO DETERMINING THAT THE SECOND GEOMETRIC RATIO IS LESS THAN THE FIRST GEOMETRIC RATIO 506

End

*FIG. 5*

LEADING VEHICLE BRAKING DETECTION

BACKGROUND

The present invention relates generally to the field of computing, and more particularly to automotive sensors.

Rear end collisions may be avoided by the early detection of braking by a preceding vehicle. Most vehicles are equipped with tail lights that turn on to indicate that the vehicle is braking. The tail lights act as a warning for trailing vehicles to decelerate in response to the braking of the preceding vehicle. Some vehicles may also be equipped with electronic systems such as an anti-lock braking system (ABS) and/or an electronic stabilizing control system (ESC) to control the deceleration of the vehicle. However, a driver's reaction time is fundamental, as it is still up to the driver to observe a flashing tail light and decelerate the trailing vehicle in time to avoid a collision. In some instances, the preceding vehicle may brake so suddenly that the driver of the trailing vehicle may not have enough time to brake. In other instances, the driver of the trailing vehicle may be too distracted to detect the braking by the preceding vehicle.

SUMMARY

Embodiments of the present invention disclose a method, computer system, and a computer program product for brake detection. The present invention may include determining a first geometric ratio associated with a rear portion of a first vehicle, from a first image of the first vehicle. The present invention may also include determining a second geometric ratio associated with the rear portion of the first vehicle, from a second image of the first vehicle. The present invention may further include, in response to determining that the second geometric ratio is less than the first geometric ratio, detecting a braking action of the first vehicle.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates a networked computing environment according to at least one embodiment;

FIG. 5 is an operational flowchart illustrating a brake detection process according to at least one embodiment;

DETAILED DESCRIPTION

Figure 2:
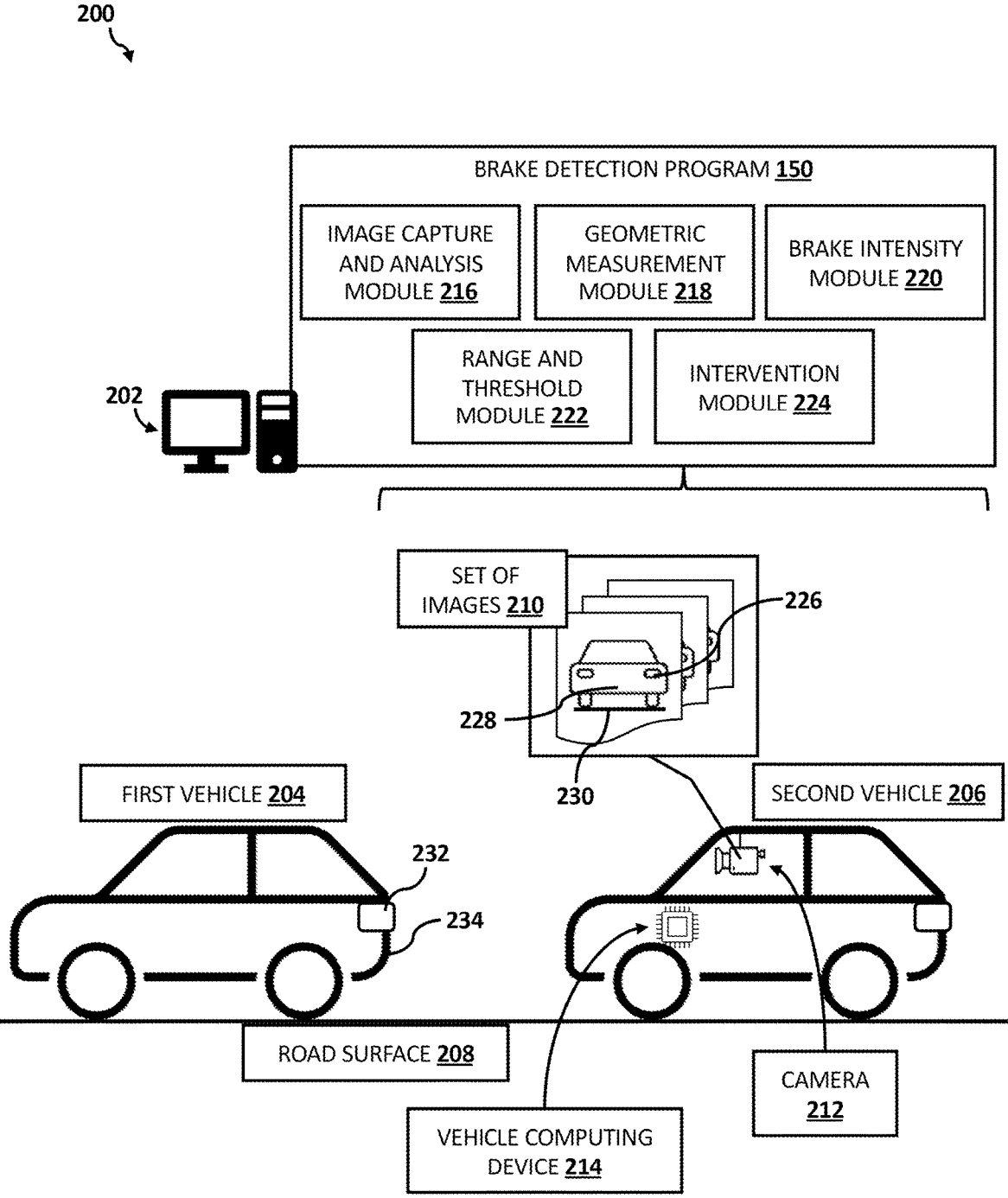
FIG. 2 is a schematic block diagram of an automotive safety environment according to at least one embodiment.

The following described exemplary embodiments provide a system, method and computer program product for automotive sensors. As such, the present embodiment has the capacity to improve the technical field of automotive sensors by providing automatic detection of braking by a preceding or leading vehicle. More specifically, a brake detection program may automatically detect an intensity of braking by a leading vehicle by analyzing one or more images of the leading vehicle captured using a camera installed on a trailing vehicle. When the leading vehicle applies the brakes, it is contemplated that some geometric measurements of the leading vehicle may vary due to a change in vehicle balance. The change in vehicle balance may provide an estimation of the deceleration of the leading vehicle.

As described previously, rear end collisions may be avoided by the early detection of braking by a preceding vehicle. Most vehicles are equipped with tail lights that turn on to indicate that the vehicle is braking. The tail lights act as a warning for trailing vehicles to decelerate in response to the braking of the preceding vehicle. Some vehicles may also be equipped with electronic systems such as an anti-lock braking system (ABS) and/or an electronic stabilizing control system (ESC) to control the deceleration of the vehicle. However, a driver's reaction time is fundamental, as it is still up to the driver to observe a flashing tail light and decelerate the trailing vehicle in time to avoid a collision. In some instances, the preceding vehicle may brake so suddenly that the driver of the trailing vehicle may not have enough time to brake. In other instances, the driver of the trailing vehicle may be too distracted to detect the braking by the preceding vehicle. Additionally, while tail lights may indicate braking, tail lights provide no indications on the intensity of the braking.

Therefore, it may be advantageous to, among other things, provide a way to implement the camera of a trailing vehicle to record a sequence of images of a rear portion of a leading vehicle. Then, it may be advantageous to analyze one or more geometric measurements in the recorded sequence of images of the leading vehicle to detect the braking and the intensity of the braking by the leading vehicle.

According to embodiments of the present disclosure, the term "first vehicle" may be used interchangeably to refer to the "leading vehicle" and/or the "preceding vehicle," and the term "second vehicle" may be used interchangeably to refer to the "trailing vehicle" and/or the "following vehicle." Therefore, the "first vehicle" (e.g., leading vehicle; preceding vehicle) may refer to a vehicle that is the next vehicle in front of the "second vehicle" (e.g., trailing vehicle; following vehicle). Similarly, the "second vehicle" may refer to a vehicle that is the next vehicle behind the "first vehicle."

As such, embodiments of the present disclosure may enable detecting an amount of braking by a first vehicle in front of a second vehicle and estimating the first vehicle's deceleration by analyzing a set of sequential images taken by a camera associated with the second vehicle.

According to one embodiment, the present disclosure may analyze two different geometric measurements associated with a shape of the first vehicle, which may always be detected by a camera installed on the second vehicle. The first geometric measurement may provide a fixed or constant value and the second geometric measurement may provide a variable value, which may increase in response to a deceleration from braking. The first and second geometric measurements associated with the first vehicle may be calculated continuously while the first vehicle and the second vehicle are in motion.

According to one embodiment, the first geometric measurement may include a distance measurement between the rear tail lights in a rear portion of the vehicle. The distance measurement between the rear tail lights may provide a constant distance value regardless of the vehicle's position, velocity, and/or acceleration/deceleration.

According to one embodiment, the second geometric measurement may include a distance measurement between the bumper of the vehicle and the ground or road on which the vehicle is moving on. In at least one embodiment, the second geometric measurement may include a distance measurement between the bumper of the vehicle and a bottom of the tire (e.g., wheel) that is in contact with the road. When there is a change in the velocity and/or in the acceleration (or deceleration) of the vehicle, the second geometric measurement may vary due to a modification in a position of the vehicle's body relative to the vehicle's wheels. For example, when the vehicle decelerates, the vehicle (e.g., body of the vehicle) may be projected forward (e.g., change of pitch; nose down). As a result, the front bumper may fall (e.g., nose down) relative to the road and the rear bumper may rise relative to the road. Therefore, the distance between the rear bumper and road may increase. Similarly, the rear tires (e.g., wheels) may be more visible and the distance measurement between the bumper of the vehicle and the bottom of the tire may increase.

In some instances, the first and second geometric measurements associated with the first vehicle may vary when the measurements are determined from a camera on the second vehicle, due to the distance between the vehicles. However, it is contemplated that a ratio (e.g., geometric ratio) between the first and second geometric measurements of the first vehicle may not change if the first vehicle's acceleration does not change, regardless of the distance between the first and second vehicles. Moreover, the geometric ratio between the first and second measurements of the first vehicle may not be affected by any modification associated with the second vehicle's (e.g., vehicle with camera) position, velocity and/or acceleration.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 according to at least one embodiment is depicted. Computing environment 100 contains an example of an environment for the execution of at least some of the computer code involved in performing the inventive methods, such as brake detection program 150. In addition to brake detection program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and brake detection program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Furthermore, despite only being depicted in computer 101, brake detection program 150 may be stored in and/or executed by, individually or in any combination, EUD 103, remote server 104, public cloud 105, and private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The brake detection program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of Bluetooth SIG, Inc. and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, a user using any combination of an EUD 103, remote server 104, public cloud 105, and private cloud 106 may implement the brake detection program 150 to automatically detect a braking action of a first vehicle in front of a second vehicle, based on analyzing one or more geometric measurements of a rear portion of the first vehicle that have been captured in a sequence of images recorded by the second vehicle. Embodiments of the present disclosure are explained in more detail below with respect to FIGS. 2 to 5.

Referring now to FIG. 2, a schematic block diagram of an automotive safety environment 200 according to at least one embodiment is depicted. According to one embodiment, the automotive safety environment 200 may include a computer system 202 having a tangible storage device and a processor that is enabled to run the brake detection program 150.

According to one embodiment, the automotive safety environment 200 may include a first vehicle 204 (e.g., leading/preceding vehicle) traveling in front of a second vehicle 206 (e.g., trailing/following vehicle) on a road surface 208.

Generally, the computer system 202 may be enabled by the brake detection program 150 to detect a velocity gradient (e.g., braking/deceleration intensity) of the first vehicle 204 based on a set of images 210 (e.g., sequential images; sequential image data) of a rear view of the first vehicle 204, as recorded by a camera 212 associated with the second vehicle 206.

According to one embodiment, the computer system 202 may include one or more components (e.g., computer 101; end user device (EUD) 103; WAN 102) of the computer environment 100 described above with reference to FIG. 1. In one embodiment, the computer system 202 may include one or more computers (e.g., computer 101) which may take the form of a vehicle computer, desktop computer, laptop computer, tablet computer, smart phone, smart watch or other wearable computer, mainframe computer, quantum computer or any other form of computer or mobile device now known or to be developed in the future that is capable of running a program, accessing a network, and/or querying a database.

According to one embodiment, the computer system 202 may provide a vehicle computing device 214 associated with the second vehicle 206. Although vehicle computing device 214 is illustrated in FIG. 2 as an in-built computing device, various aspects of the vehicle computing device 214 may operate as a server (e.g., remote server 104) in a client-server model. Further, aspects of the computer system 202 (e.g., including vehicle computing device 214) may operate in a cloud computing service model, such as Software as a Service (SaaS), Platform as a Service (PaaS), or Infrastructure as a Service (IaaS). In one embodiment, the computer system 202 may also be implemented as a cloud computing deployment model, such as a private cloud, community cloud, public cloud, or hybrid cloud.

In one embodiment, the brake detection program 150 may include a single computer program or multiple program modules or sets of instructions being executed by the processor of the computer system 202 (e.g., vehicle computing device 214). In one embodiment, the brake detection program 150 may include routines, objects, components, units, logic, data structures, and actions that may perform particular tasks or implement particular abstract data types. In one embodiment, the brake detection program 150 may be practiced in distributed cloud computing environments where tasks may be performed by local and/or remote processing devices which may be linked through a communication network (e.g., WAN 102). In at least one embodiment, the brake detection program 150 (e.g., the various modules) may be executed on a single computing device (e.g., vehicle computing device 214).

According to one embodiment, the brake detection program 150 may include at least the following modules: an image capture and analysis module 216, a geometric measurement module 218, a brake intensity module 220, a range and threshold module 222, and an intervention module 224. Each of these modules will be detailed further below with reference to FIGS. 2-4.

According to one embodiment, the image capture and analysis module 216 may implement the camera 212 of the second vehicle 206 to capture the set of images 210. In one embodiment, the set of images 210 may be recorded as continuous video and divided into sequential image frames. Thus, the set of images 210 may include a set of sequential images.

According to one embodiment, the set of images 210 captured by the camera 212 may include images of a rear view of the first vehicle 204. In one embodiment, the image capture and analysis module 216 may implement computer vision techniques to detect one or more objects in the set of images 210. In one embodiment, the image capture and analysis module 216 may detect a tail light object 226, rear vehicle surface object 228, and a road surface object 230 in each image of the set of images 210. The tail light object 226 may be an image of a set of tail lights 232 of the first vehicle 204 and may therefore be referred to as the set of tail lights in the image 210. The rear vehicle surface object 226 may be an image of a rear vehicle surface 234 (e.g., bumper) of the first vehicle 204 and may therefore be referred to as the rear vehicle surface (e.g., bumper) in the image 210. The road surface object 230 may be an image of the road surface 208 and may therefore be referred to as the road surface in the image 210.

Figure 3:
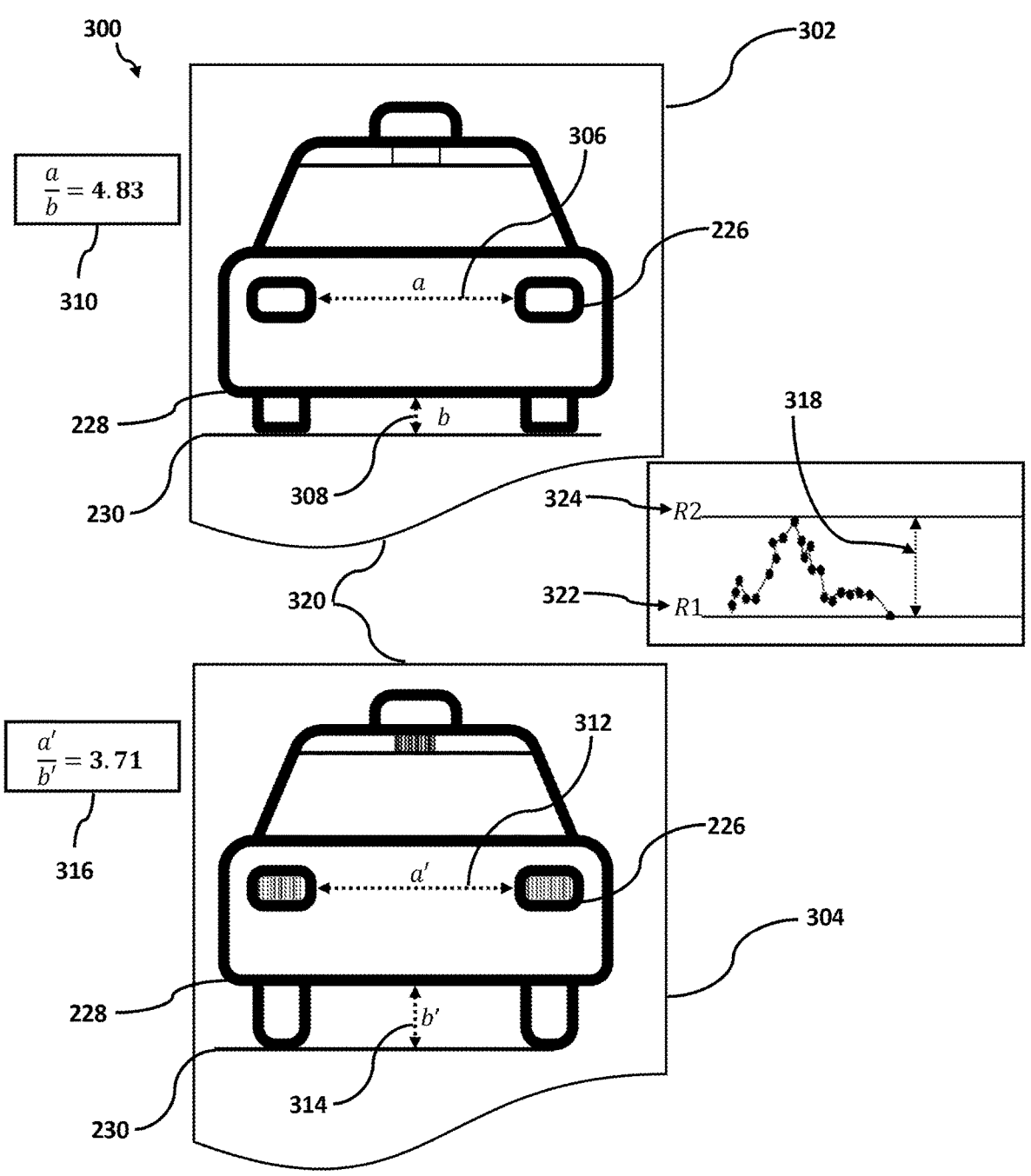
FIG. 3 is a schematic block diagram of a first sequential image data used by a brake detection program 150 in the automotive safety environment according to at least one embodiment.

Referring now to FIG. 3, a schematic block diagram 300 of a first sequential image data used by the brake detection program 150 in the automotive safety environment 200 according to at least one embodiment is depicted.

According to one embodiment, the set of images 210 captured by the camera 212 may include a first image 302 of the first vehicle 204 and a second image 304 of the first vehicle 204. In one embodiment, the image capture and analysis module 216 may detect the set of tail lights 226 in the first image 302 and the second image 304 of the first vehicle 204. The image capture and analysis module 216 may also detect the rear vehicle surface 228 (e.g., rear bumper) in the first image 302 and the second image 304 of the first vehicle 204. The image capture and analysis module 216 may further detect the road surface 230 in the first image 302 (e.g., first road surface) and the second image 304 (e.g., second road surface) of the first vehicle 204.

According to one embodiment, the brake detection program 150 may implement the geometric measurement module 218 to analyze the first image 302. The geometric measurement module 218 may be implemented to measure a first constant distance 306 (e.g., first geometric distance (a)) between the set of tail lights 226 of the first vehicle 204.

The geometric measurement module 218 may also be implemented to measure a first variable distance 308 (e.g., second geometric distance (b)) between the rear vehicle surface 228 (e.g., bumper) on the rear portion of the first vehicle and 204 the road surface 230. In at least one embodiment, the first variable distance 308 may include a perpendicular distance (e.g., first perpendicular distance). Then, the brake detection program 150 may implement the geometric measurement module 218 to determine (e.g., calculate) a first geometric ratio 310 associated with the rear portion of the first vehicle 204, from the first image 302 (e.g., first ratio between the measured first constant distance 306 and the measured first variable distance 308). The first geometric ratio 310 associated with the first vehicle 204 may be calculated continuously while the first vehicle 204 and the second vehicle 206 are in motion.

Similarly, the brake detection program 150 may implement the geometric measurement module 218 to analyze the second image 304. The geometric measurement module 218 may be implemented to measure a second constant distance 312 (e.g., first geometric distance (a')) between the set of tail lights 226 of the first vehicle 204. The geometric measurement module 218 may also be implemented to measure a second variable distance 314 (e.g., second geometric distance (b')) between the rear vehicle surface 228 (e.g., bumper) on the rear portion of the first vehicle and 204 the road surface 230. In at least one embodiment, the second variable distance 314 may include a perpendicular distance (e.g., second perpendicular distance). Then, the brake detection program 150 may implement the geometric measurement module 218 to determine (e.g., calculate) a second geometric ratio 316 associated with the rear portion of the first vehicle 204, from the second image 304 (e.g., second ratio between the measured second constant distance 312 and the measured second variable distance 314). The second geometric ratio 316 associated with the first vehicle 204 may be calculated continuously while the first vehicle 204 and the second vehicle 206 are in motion.

According to one embodiment, the brake detection program 150 may implement the brake intensity module 220 to compare the first geometric ratio 310 and the second geometric ratio 316 from the respective sequential first and second images 302, 304. In one embodiment, the comparison between the first geometric ratio 310 and the second geometric ratio 316 from two consecutive images (e.g., first image 302; second image 304) may be performed continuously while the first vehicle 204 and the second vehicle 206 are in motion.

In one embodiment, if the brake intensity module 220 determines that the second geometric ratio 316 is equal to the first geometric ratio 310, then the brake intensity module 220 may detect that the first vehicle 204 is moving at a constant acceleration (e.g., first vehicle 204 is not decelerating/braking). However, if the brake intensity module 220 determines that the second geometric ratio 316 is less than the first geometric ratio 310, then the brake intensity module 220 may detect a braking action (e.g., deceleration) of the first vehicle 204.

If the first vehicle 204 is braking, the second frame may be similar to the second image 304 where the second variable distance 314 (e.g., second geometric distance (b')) is illustrated to be proportionally greater than the first variable distance 308 (e.g., second geometric distance (b)) in the first image 302 (e.g., first frame). For example, as shown in FIG. 2, the second geometric ratio 316 (e.g., a'/b'=3.71) may be lower than the first geometric ratio 310 (e.g., a/b=4.83) since the physical distance corresponding to the second variable distance 314 (e.g., second geometric distance (b')) has increased.

According to one embodiment, the brake intensity module 220 may also determine an intensity of the braking action of the first vehicle 204 based on calculating a difference (e.g., change/delta) between the first geometric ratio 310 and the second geometric ratio 316. In various embodiments, the brake intensity module 220 may determine that an increase in the change or delta between the first geometric ratio 310 and the second geometric ratio 316 may indicate a corresponding increase in the intensity of the braking action.

According to one embodiment, the brake detection program 150 may implement the range and threshold module 222 to establish a geometric ratio range 318. In one embodiment, the geometric ratio range 318 may be generated using a first set of sequential images 320 captured by the camera 212. In one embodiment, the first set of sequential images 320 may include the first image 302 and the second image 304. In one embodiment, the first set of sequential images 320 may refer to an initial set of sequential images which may be used to generate the geometric ratio range 318, indicating a "normal geometric ratio range" associated with a "normal operation" of the first vehicle 204 (e.g., safe acceleration/deceleration of the first vehicle 204). In one embodiment, the geometric ratio range 318 may include a lower geometric ratio threshold (R1) 322 and an upper geometric ratio threshold (R2) 324. In one embodiment, the upper geometric ratio threshold (R2) 324 may refer to first geometric ratio 310 and the lower geometric ratio threshold (R1) 322 may refer to the second geometric ratio 316. In one embodiment, the range and threshold module 222 may set the lower geometric ratio threshold (R1) 322 as a threshold value for an "abnormal geometric ratio" (e.g., going below the threshold may indicate sudden braking by the first vehicle 204). In various embodiments discussed further below with reference to FIG. 4, the range and threshold module 222 may continuously monitor the geometric ratio (e.g., third geometric ratio 408) of the first vehicle 204 to determine if the geometric ratio moves out of the normal geometric ratio range (e.g., falls below the lower geometric ratio threshold (R1) 322. The continuous monitoring may be performed by the brake detection program 150 while the first vehicle 204 and the second vehicle 206 are both in motion.

Figure 4:
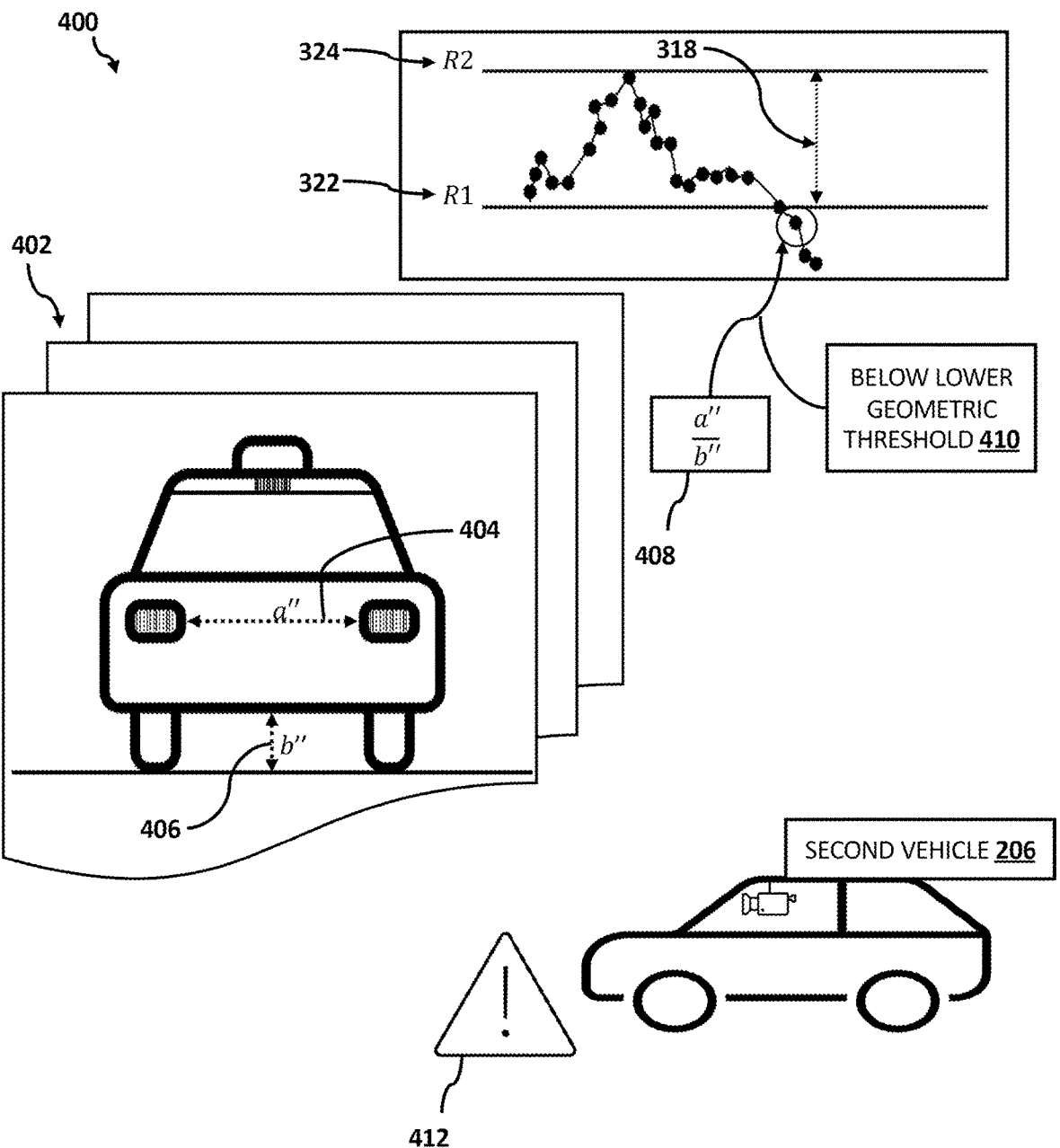
FIG. 4 is a schematic block diagram of a second sequential image data used by the brake detection program in the automotive safety environment according to at least one embodiment.

Referring now to FIG. 4, a schematic block diagram 400 of a second sequential image data used by the brake detection program 150 in the automotive safety environment 200 according to at least one embodiment is depicted.

According to one embodiment, the brake detection program 150 may implement the image capture and analysis module 216 to capture a second set of sequential images 402 of the first vehicle 204. In one embodiment, the second set of sequential images 402 may refer to sequential images captured at a point later in time relative to the first set of sequential images 320.

According to one embodiment, the brake detection program 150 may implement the geometric measurement module 218 to analyze the second set of sequential images 402. The geometric measurement module 218 may be implemented to measure a third constant distance 404 (e.g., first geometric distance (a")) between the set of tail lights 226 of the first vehicle 204. The geometric measurement module 218 may also be implemented to measure a third variable distance 406 (e.g., second geometric distance (b")) between the rear vehicle surface 228 (e.g., bumper) on the rear portion of the first vehicle and 204 the road surface 230. Then, the brake detection program 150 may implement the geometric measurement module 218 to determine (e.g., calculate) a third geometric ratio 408 associated with the rear portion of the first vehicle 204, from the second set of sequential images 402 (e.g., third ratio between the measured first constant distance 306 and the measured first variable distance 308).

According to one embodiment, the brake detection program 150 may implement the range and threshold module 222 to determine if the third geometric ratio 408 falls below the lower geometric threshold 322. In response to detecting a below threshold event 410, where the third geometric ratio 408 falls below the lower geometric ratio threshold 322 of the established geometric ratio range 318, the brake detection program 150 may predict a sudden-brake action of the first vehicle 204. In response to the predicted sudden-brake action of the first vehicle 204, the brake detection program 150 may implement the intervention module 224 to trigger an intervention 412 in the second vehicle 206 behind the first vehicle 204 to prevent a collision between the second vehicle 206 and the first vehicle 204. In various embodiments, the intervention 412 may include activating an alarm in the second vehicle 206 to instruct the driver of the second vehicle 206 to apply the brakes. In other embodiment, the intervention 412 may include automatically braking the second vehicle 206. Other suitable interventions 412 may also be implemented to prevent a collision between the second vehicle 206 and the first vehicle 204.

According to one embodiment, the brake detection program 150 may calculate multiple consecutive third geometric ratios 408. If the range and threshold module 222 detects multiple consecutive below threshold events 410, where multiple consecutive third geometric ratios 408 fall below the lower geometric ratio threshold 322 of the established geometric ratio range 318, the brake detection program 150 may predict the sudden-brake action of the first vehicle 204. In response to the predicted sudden-brake action of the first vehicle 204, the brake detection program 150 may implement the intervention module 224 to trigger the intervention 412 in the second vehicle 206 behind the first vehicle 204 to prevent a collision between the second vehicle 206 and the first vehicle 204.

Referring now to FIG. 5, an operational flowchart illustrating an exemplary brake detection process 500 used by the brake detection program 150 according to at least one embodiment is depicted. FIG. 5 provides a description of process 500 with reference to FIGS. 2-4.

At 502, a first geometric ratio associated with a rear portion of a first vehicle is determined from a first image of the first vehicle.

In one embodiment, the brake detection program 150 may detect a set of tail lights of the first vehicle in the first image of the first vehicle, as described previously with reference to FIG. 3. In one embodiment, the brake detection program 150 may also detect the rear vehicle surface on the rear portion of the first vehicle in the first image of the first vehicle, where the detected rear vehicle surface in the first image may include a rear bumper of the first vehicle, as described previously with reference to FIG. 3. In one embodiment, the brake detection program 150 may further detect a first road surface in the first image of the first vehicle.

According to one embodiment, the brake detection program 150 may measure a first constant distance between the set of tail lights of the first vehicle, as described previously with reference to FIG. 3. In one embodiment, the brake detection program 150 may measure a first variable distance (e.g., a first perpendicular distance) between a rear vehicle surface on the rear portion of the first vehicle and a first road surface, as described previously with reference to FIG. 3. Then, the brake detection program 150 may determine the first geometric ratio between the first measured constant distance and the first measured variable distance, as described previously with reference to FIG. 3.

Then at 504, a second geometric ratio associated with the rear portion of the first vehicle is determined from a second image of the first vehicle.

In one embodiment, the brake detection program 150 may detect a set of tail lights of the first vehicle in the second image of the first vehicle, as described previously with reference to FIG. 3. In one embodiment, the brake detection program 150 may also detect the rear vehicle surface on the rear portion of the first vehicle in the second image of the first vehicle, where the detected rear vehicle surface in the first image may include the rear bumper of the first vehicle, as described previously with reference to FIG. 3. In one embodiment, the brake detection program 150 may further detect a second road surface in the second image of the first vehicle.

According to one embodiment, the brake detection program 150 may measure a second constant distance between the set of tail lights of the first vehicle, as described previously with reference to FIG. 3. In one embodiment, the brake detection program 150 may measure a second variable distance (e.g., a second perpendicular distance) between the rear vehicle surface on the rear portion of the first vehicle and the second road surface, as described previously with reference to FIG. 3. Then, the brake detection program 150 may determine the second geometric ratio between the second measured constant distance and the second measured variable distance, as described previously with reference to FIG. 3.

Thereafter at 506, a braking action of the first vehicle is detected responsive to determining that the second geometric ratio is less than the first geometric ratio.

According to one embodiment, the brake detection program 150 may detect a constant acceleration of the first vehicle, responsive to determining that the second geometric ratio is equal to the first geometric ratio, as described previously with reference to FIG. 3. In some embodiments, the brake detection program 150 may determine an intensity of the braking action of the first vehicle based on a difference (e.g., change/delta) between the first geometric ratio and the second geometric ratio, as described previously with reference to FIG. 3.

According to one embodiment, the brake detection program 150 may capture a first set of sequential images of the first vehicle, where the first captured set of sequential images may include the first image of the first vehicle and the second image of the first vehicle, as described previously with reference to FIG. 3. In one embodiment, the brake detection program 150 may establish a geometric ratio range for the first vehicle based on the first captured set of sequential images. In at least one embodiment, the established geometric ratio range may include a lower geometric ratio threshold and an upper geometric ratio threshold, as described previously with reference to FIG. 3.

According to one embodiment, the brake detection program 150 may capture a second set of sequential images of the first vehicle, as described previously with reference to FIG. 4. Then, the brake detection program 150 may determine a third geometric ratio associated with the rear portion of the first vehicle, from the second captured set of sequential images, as described previously with reference to FIG. 4. Next, the brake detection program 150 may continuously monitor the third determined geometric ratio to detect whether the third determined geometric ratio falls below the lower geometric ratio threshold of the established geometric ratio range, as described previously with reference to FIG. 4.

According to one embodiment, in response to detecting that the monitored third determined geometric ratio falls below the lower geometric ratio threshold of the established geometric ratio range, the brake detection program 150 may predict a sudden-brake action of the first vehicle, as described previously with reference to FIG. 4. Thereafter, the brake detection program 150 may trigger an intervention in a second vehicle behind the first vehicle to prevent a collision between the second vehicle and the first vehicle.

It is contemplated that the brake detection program 150 may provide several advantages and/or improvements to the technical field of automotive sensors and automotive safety. The brake detection program 150 may also improve the functionality of a computer (e.g., vehicle computing device 214) because the brake detection program 150 may enable the computer to automatically detect a braking action of a first vehicle in front of a second vehicle, based on analyzing one or more geometric measurements of a rear portion of the first vehicle that have been captured in a sequence of images recorded by the second vehicle. The brake detection program 150 may enable the computer to provide low latency safety interventions. For example, even at standard camera frame rates (e.g., 50 frames per second), analysis and intervention latency of 3 to 4 frames implies a response time under 0.1 seconds. If high frame rate cameras are implemented by the brake detection program 150, the intervention response time may be further reduced.

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   processing pixel data of a first digital image and a second digital image of a rear portion of a first vehicle, the first digital image and the second digital image captured by a camera associated with a second vehicle traveling behind the first vehicle;
   based on the processed pixel data, for each of the first digital image and the second digital image, automatically:
      detecting two laterally spaced rear reference features fixed on the rear portion of the first vehicle and determining, from the first digital image, a first constant distance between the two laterally spaced rear reference features and, from the second digital image, a second constant distance between the two laterally spaced rear reference features; and
      detecting a rear bumper of the first vehicle and a road surface and determining a first variable distance between the rear bumper and the road surface in the first digital image and a second variable distance between the rear bumper and the road surface in the second digital image;

determining a first geometric ratio from the first digital image by normalizing the first variable distance using the first constant distance;

determining a second geometric ratio from the second digital image by normalizing the second variable distance using the second constant distance; and in response to determining that the second geometric ratio is less than the first geometric ratio, detecting, by the second vehicle, a braking action of the first vehicle.

2. The computer-implemented method of claim 1, further comprising:

in response to determining that the second geometric ratio is equal to the first geometric ratio, detecting a constant acceleration of the first vehicle.

3. The computer-implemented method of claim 1, further comprising:

determining an intensity of the braking action of the first vehicle based on a difference between the first geometric ratio and the second geometric ratio.

4. The computer-implemented method of claim 1, wherein the two laterally spaced rear reference features fixed on the rear portion of the first vehicle comprises a set of tail lights of the first vehicle.

5. The computer-implemented method of claim 1, wherein determining the first variable distance further comprises:

determining a first perpendicular distance between the rear bumper of the first vehicle and the road surface in the first digital image.

6. The computer-implemented method of claim 1, wherein determining the second variable distance further comprises:

determining a second perpendicular distance between the rear bumper of the first vehicle and the road surface in the second digital image.

7. The computer-implemented method of claim 1, further comprising:

capturing a first set of sequential digital images of the first vehicle, wherein the first captured set of sequential digital images includes the first digital image of the first vehicle and the second digital image of the first vehicle; and establishing a geometric ratio range for the first vehicle based on the first captured set of sequential digital images, wherein the established geometric ratio range includes a lower geometric ratio threshold and an upper geometric ratio threshold.

8. The computer-implemented method of claim 7, further comprising:

capturing a second set of sequential digital images of the first vehicle;

determining a third geometric ratio associated with the rear portion of the first vehicle from the second captured set of sequential digital images; and monitoring the third determined geometric ratio to detect whether the third determined geometric ratio falls below the lower geometric ratio threshold of the established geometric ratio range.

9. The computer-implemented method of claim 8, further comprising:

in response to detecting that the monitored third determined geometric ratio falls below the lower geometric ratio threshold of the established geometric ratio range, predicting a sudden-brake action of the first vehicle; and triggering an intervention in the second vehicle behind the first vehicle to prevent a collision between the second vehicle and the first vehicle.

10. A computer system for brake detection, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

processing pixel data of a first digital image and a second digital image of a rear portion of a first vehicle, the first digital image and the second digital image captured by a camera associated with a second vehicle traveling behind the first vehicle;

based on the processed pixel data, for each of the first digital image and the second digital image, automatically:

detecting two laterally spaced rear reference features fixed on the rear portion of the first vehicle and determining, from the first digital image, a first constant distance between the two laterally spaced rear reference features and, from the second digital image, a second constant distance between the two laterally spaced rear reference features; and detecting a rear bumper of the first vehicle and a road surface and determining a first variable distance between the rear bumper and the road surface in the first digital image and a second variable distance between the rear bumper and the road surface in the second digital image;

determining a first geometric ratio from the first digital image by normalizing the first variable distance using the first constant distance;

determining a second geometric ratio from the second digital image by normalizing the second variable distance using the second constant distance; and in response to determining that the second geometric ratio is less than the first geometric ratio, detecting, by the second vehicle, a braking action of the first vehicle.

11. The computer system of claim 10, further comprising:

capturing a first set of sequential digital images of the first vehicle, wherein the first captured set of sequential digital images includes the first digital image of the first vehicle and the second digital image of the first vehicle; and establishing a geometric ratio range for the first vehicle based on the first captured set of sequential digital images, wherein the established geometric ratio range includes a lower geometric ratio threshold and an upper geometric ratio threshold.

12. The computer system of claim 11, further comprising:

capturing a second set of sequential digital images of the first vehicle;

determining a third geometric ratio associated with the rear portion of the first vehicle from the second captured set of sequential digital images; and monitoring the third determined geometric ratio to detect whether the third determined geometric ratio falls below the lower geometric ratio threshold of the established geometric ratio range.

13. The computer system of claim 12, further comprising:

in response to detecting that the monitored third determined geometric ratio falls below the lower geometric ratio threshold of the established geometric ratio range, predicting a sudden-brake action of the first vehicle; and triggering an intervention in the second vehicle behind the first vehicle to prevent a collision between the second vehicle and the first vehicle.

14. A computer program product for brake detection, comprising:

one or more computer-readable storage media and program instructions collectively stored on the one or more computer-readable storage media, the program instructions executable by a processor to cause the processor to perform a method comprising:

processing pixel data of a first digital image and a second digital image of a rear portion of a first vehicle, the first digital image and the second digital image captured by a camera associated with a second vehicle traveling behind the first vehicle;

based on the processed pixel data, for each of the first digital image and the second digital image, automatically:

detecting two laterally spaced rear reference features fixed on the rear portion of the first vehicle and determining, from the first digital image, a first constant distance between the two laterally spaced rear reference features and, from the second digital image, a second constant distance between the two laterally spaced rear reference features; and detecting a rear bumper of the first vehicle and a road surface and determining a first variable distance between the rear bumper and the road surface in the first digital image and a second variable distance between the rear bumper and the road surface in the second digital image;

determining a first geometric ratio from the first digital image by normalizing the first variable distance using the first constant distance;

determining a second geometric ratio from the second digital image by normalizing the second variable distance using the second constant distance; and in response to determining that the second geometric ratio is less than the first geometric ratio, detecting, by the second vehicle, a braking action of the first vehicle.

15. The computer program product of claim 14, further comprising:

capturing a first set of sequential digital images of the first vehicle, wherein the first captured set of sequential digital images includes the first digital image of the first vehicle and the second digital image of the first vehicle; and establishing a geometric ratio range for the first vehicle based on the first captured set of sequential digital images, wherein the established geometric ratio range includes a lower geometric ratio threshold and an upper geometric ratio threshold.

16. The computer program product of claim 15, further comprising:

capturing a second set of sequential digital images of the first vehicle;

determining a third geometric ratio associated with the rear portion of the first vehicle from the second captured set of sequential digital images; and monitoring the third determined geometric ratio to detect whether the third determined geometric ratio falls below the lower geometric ratio threshold of the established geometric ratio range.

17. The computer program product of claim 16, further comprising:

in response to detecting that the monitored third determined geometric ratio falls below the lower geometric ratio threshold of the established geometric ratio range, predicting a sudden-brake action of the first vehicle; and triggering an intervention in the second vehicle behind the first vehicle to prevent a collision between the second vehicle and the first vehicle.

* * * * *